US012795572B2

(12) United States Patent
Zhang et al.

(10) Patent No.: US 12,795,572 B2
(45) Date of Patent: Nov. 10, 2026

(54) METHOD FOR SYNCHRONIZATION

(71) Applicant: ZTE CORPORATION, Shenzhen (CN)

(72) Inventors: Nan Zhang, Shenzhen (CN); Wei Cao, Shenzhen (CN); Jianqiang Dai, Shenzhen (CN); Zhen Yang, Shenzhen (CN); Fangyu Cui, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 303 days.

(21) Appl. No.: 17/851,213

(22) Filed: Jun. 28, 2022

(65) Prior Publication Data

US 2022/0338150 A1 Oct. 20, 2022

Related U.S. Application Data

(63) Continuation of application No. PCT/CN2020/090625, filed on May 15, 2020.

(51) Int. Cl.
*H04W 56/00* (2009.01)
*H04W 72/1268* (2023.01)

(52) U.S. Cl.
CPC ..... *H04W 56/0045* (2013.01); *H04W 56/001* (2013.01); *H04W 56/006* (2013.01); *H04W 72/1268* (2013.01)

(58) Field of Classification Search
CPC ........... H04W 56/0045; H04W 56/001; H04W 56/006; H04W 72/1268; H04W 56/004;
(Continued)

(56) References Cited

U.S. PATENT DOCUMENTS 10,505,624 B2 12/2019 Fourtet et al.
2007/0149206 A1* 6/2007 Wang ................ H04W 56/0045 455/450
(Continued)

FOREIGN PATENT DOCUMENTS

WO WO-2016163843 A1 * 10/2016 ........... H04L 5/0057
WO WO-2018/052355 A1 3/2018
(Continued)

OTHER PUBLICATIONS

3GPP (3GPP TSG-RAN WG1 Meeting #99, R1-1912725, Reno, USA, Nov. 18-22, 2019) (Year: 2019).*
(Continued)

*Primary Examiner* — Nicholas A Jensen
*Assistant Examiner* — Oladiran Gideon Olaleye
(74) *Attorney, Agent, or Firm* — Foley & Lardner LLP

(57) ABSTRACT

Presented are wireless communication methods for use in a wireless terminal. The wireless communication method can include determining at least one synchronization value based on information received from a wireless network node, where the information received from the wireless network node can include at least one of timing advanced value obtained at the wireless network node, or timing advanced value drift rate obtained at the wireless network node. The wireless communication method can include transmitting, to the wireless network node, a signal based on the at least one synchronization value by applying the at least one synchronization value after the at least one synchronization value is determined. The transmission of the signal can include a plurality of transmission parts, where a time gap is inserted between two contiguous transmission parts.

8 Claims, 10 Drawing Sheets

(58) Field of Classification Search
CPC ......... H04W 56/0055; H04W 56/0015; H04W 74/0816; H04B 7/18563; H04B 7/01; H04L 5/0082; H04L 27/2657
USPC .......................................................... 370/503
See application file for complete search history.

(56) References Cited

U.S. PATENT DOCUMENTS

| | | | | |
|---|---|---|---|---|
| 2017/0019928 | A1 * | 1/2017 | Viraraghavan | H04L 27/26526 |
| 2018/0160440 | A1 * | 6/2018 | Hosseini | H04W 72/23 |
| 2018/0242268 | A1 | 8/2018 | Rune et al. | |
| 2019/0342845 | A1 | 11/2019 | Laselva et al. | |
| 2019/0394738 | A1 | 12/2019 | Abedini et al. | |
| 2020/0107348 | A1 * | 4/2020 | Park | H04W 72/1268 |
| 2021/0058884 | A1 | 2/2021 | Liu et al. | |
| 2021/0345281 | A1 | 11/2021 | Yang et al. | |

FOREIGN PATENT DOCUMENTS

| | | | | |
|---|---|---|---|---|
| WO | WO-2019029372 | A1 * | 2/2019 | H04L 27/26025 |
| WO | WO-2019/214380 | A1 | 11/2019 | |
| WO | WO-2020/034574 | A1 | 2/2020 | |

OTHER PUBLICATIONS

R1-1912725 On NTN synchronization, random access, and timing advance, Nov. 2019 (Year: 2019).*

Office Action for CA Appl. No. 3,161,251, dated Mar. 12, 2024 (6 pages).

First Office Action for CN Appl. No. 202310923232.3, dated Apr. 4, 2024 (with English translation, 12 pages).

CATT, "PRACH design and UL timing advance" 3GPP TSG RAN WG1 Meeting #97, R1-1906325, May 17, 2019, Reno, USA (7 pages).

Extended European Search Report for EP Appl. No. 20896116.9, dated Nov. 8, 2022 (9 pages).

Ericsson, "On NTN synchronization, random access, and timing advance" 3GPP TSG-RAN WG1 Meeting #99, R1-1912725, Nov. 18, 2019, Reno, USA (24 pages).

International Search Report and Written Opinion for PCT Appl. No. PCT/CN2020/090625, mailed Feb. 20, 2021 (8 pages).

NTT DOCOMO, Inc., "Time Synchronisation for IIOT" 3GPP TSG-RAN WG2 #104, R2-1818254, Nov. 12, 2018, Spoken, USA (10 pages).

Oppo, "Remaining issues for procedure of 2-step RACH" 3GPP TSG RAN WG1 #100, R1-2000477, Feb. 24, 2020, e-Meeting (3 pages).

Notice of Grounds of Rejection for JP Appl. No. 2024-130892, dated Jun. 10, 2025 (with English translation, 7 pages).

Decision to Grant a Patent for JP Appl. No. 2024-130892, dated Sep. 16, 2025 (with English translation, 5 pages).

Office Action for KR Appl. No. 10-2022-7022132, dated Dec. 10, 2025 (with English translation, 5 pages).

Notice of Allowance on KR Appl. No. 10-2022-7022132 dated Jul. 14, 2026 (11 pages with English translation).

* cited by examiner

METHOD FOR SYNCHRONIZATION

CROSS-REFERENCE TO RELATED APPLICATION

This application claims the benefit of priority under 35 U.S.C. § 120 as a continuation of PCT Patent Application No. PCT/CN2020/090625, filed on May 15, 2020, the disclosure of which is incorporated herein by reference in its entirety.

TECHNICAL FIELD

This document is directed generally to wireless communications.

SUMMARY

In non-terrestrial networks, a relative distance between a base station (BS) and a user equipment (UE) may drastically change because of the movement of the BS and/or the UE. FIG. 1 shows a schematic diagram of the non-terrestrial network. In FIG. 1, the BS (e.g. a satellite) moves along a trajectory from time t0 to t1 and the relative distance between the BS and the UE dramatically changes from distance d1 to d2. Because of the dramatic change of the relative distance between the BS and the UE, severe synchronization problems regarding timing and frequency for both downlink (DL) and uplink (UL) directions may occur.

Meanwhile, in a terrestrial network, although the change of the relative distance is limited (the relative distance may still change especially when UE moves with high speed and/or a relay node (e.g. integrated access and backhaul (IAB) node) has mobility), reference signal (RS) and signal design with larger overhead may be also needed to maintain the synchronization regarding the time and frequency for both DL and UL.

This document relates to methods, systems, and devices for synchronization, and more particularly to methods, systems, and devices for synchronization in both non-terrestrial network and terrestrial network.

The present disclosure relates to a wireless communication method for use in a wireless terminal, the wireless communication method comprising:

determining at least one synchronization value, and transmitting, to a wireless network node, a signal based on the at least one synchronization value.

Various embodiments may preferably implement the following features:

Preferably, the at least one synchronization value comprises at least one of a timing advanced value or a frequency offset.

Preferably, the frequency offset is quantized by one of a sub-carrier spacing or a channel raster.

Preferably, the synchronization value is determined based on information received from the wireless network node, wherein the information includes at least one component of at least one of:

timing information related to transmissions from the wireless network node to the wireless terminal, status information of the wireless network node, timing advanced value obtained at the wireless network node, timing advanced value drift rate obtained at the wireless network node, Doppler drift obtained at the wireless network node, or Doppler drift rate obtained at the wireless network node.

Preferably, the wireless communication method further comprises transmitting, to the wireless network node, a request for the information Preferably, the information comprises at least one differential component corresponding to the at least one status value.

Preferably, the signal comprises at least one of a message for random access procedure, physical uplink shared channel scheduled by the wireless network node, physical uplink shared channel scheduled by the wireless network node, or periodic uplink resource configured by the wireless network node.

Preferably, the transmitting, to the wireless network node, the signal based on the at least one synchronization value comprises:

transmitting, to the wireless network node, the signal by applying the at least one synchronization value.

Preferably, the at least one synchronization value is applied for transmitting the signal after the at least one synchronization value is determined.

Preferably, the synchronization value applied for transmitting the signal comprises at least one of:

a synchronization value determined a time offset before transmitting the signal, a synchronization value determined the time offset before receiving scheduling information for transmitting the signal, or a synchronization value reported to the wireless network before receiving the scheduling information for transmitting the signal.

Preferably, the transmission of the signal comprises a plurality of transmission parts, wherein each of the plurality of transmission parts is transmitted by applying one of the at least one synchronization value.

Preferably, a gap is inserted between two contiguous transmission parts.

Preferably, the gap between two contiguous transmission parts is larger than a threshold.

Preferably, a time length of each of the plurality of transmission parts is smaller than a duration threshold.

Preferably, a valid time of applying each of the at least one synchronization value is smaller than a valid time threshold.

Preferably, the transmitting, to the wireless network node, the signal based on the at least one synchronization value comprises:

transmitting, to the wireless network node, the at least one synchronization value carried in the signal.

Preferably, the transmitting the signal carrying at least one synchronization value comprises at least one of:

transmitting the signal carrying at least one synchronization value in response to a request received from the wireless network node, transmitting the signal carrying at least one synchronization value in response to a configuration received from the wireless network node, or transmitting the signal carrying at least one synchronization value in a random access procedure.

Preferably, the at least one synchronization value is transmitted in the signal a time offset after the at least one synchronization value is determined.

Preferably, transmitting the at least one synchronization value does not collide with other channel transmissions.

Preferably, the signal comprises a random access message, wherein at least one of the first synchronization value or the last synchronization value applied for transmitting the random access message is carried in data part of random access message.

Preferably, the synchronization value applied for transmitting the signal is carried in the signal.

Preferably, the latest synchronization value applied for transmitting the signal is carried in the signal.

Preferably, the synchronization value determined a time offset before transmitting the signal is carried in the signal.

Preferably, the synchronization value determined a time offset before receiving scheduling information for transmitting the signal is carried in the signal.

Preferably, the latest determined synchronization value is carried in the signal.

The present disclosure relates to a wireless communication method for use in a wireless network node. The wireless communication method comprises:

receiving, from a wireless terminal, at least one synchronization value, and scheduling, for the wireless terminal, uplink resources by applying the at least one synchronization value.

Various embodiments may preferably implement the following features:

Preferably, the at least one synchronization value comprises at least one of a timing advanced value or a frequency offset.

Preferably, the frequency offset is quantized by one of a sub-carrier spacing or a channel raster.

Preferably, the at least one synchronization value is carried in at least one of a message for random access procedure, physical uplink shared channel scheduled by the wireless network node, physical uplink shared channel scheduled by the wireless network node, or periodic uplink resource configured by the wireless network node.

Preferably, the synchronization value applied for scheduling the uplink resources is used a time offset after the synchronization value is received.

Preferably, the uplink resources are scheduled based on the latest synchronization value received from the wireless terminal.

The present disclosure relates to a wireless terminal. The wireless terminal comprises:

a processor, configured to determine at least one synchronization value, and a communication unit, configured to transmit, to a wireless network node, a signal based on the at least one synchronization value.

Various embodiments may preferably implement the following feature:

Preferably, the processor is configured to perform a wireless communication method of any of the foregoing described methods.

The present disclosure relates to a wireless network node. The wireless network node comprises:

a communication unit, configured to receive, from a wireless terminal, at least one synchronization value, and a processor, configured to schedule, for the wireless terminal, uplink resources by applying the at least one synchronization value.

Various embodiments may preferably implement the following feature:

Preferably, the processor is configured to perform a wireless communication method of any of the foregoing described methods.

The present disclosure relates to a computer program product comprising a computer-readable program medium code stored thereupon, the code, when executed by a processor, causing the processor to implement a wireless communication method of any of the foregoing described methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

DETAILED DESCRIPTION

Figure 1:
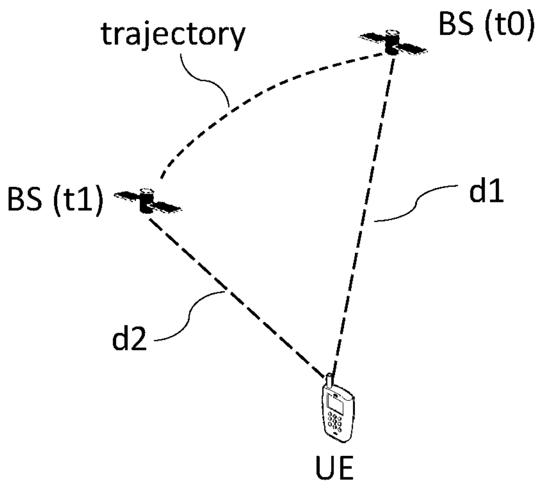
FIG. 1 shows a schematic diagram of non-terrestrial network.
Figure 2:
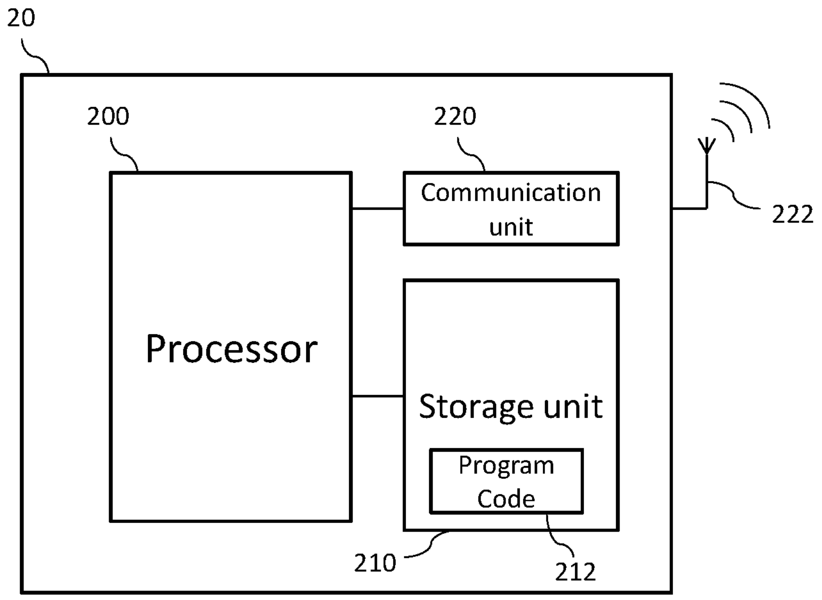
FIG. 2 shows an example of a schematic diagram of a wireless terminal according to an embodiment of the present disclosure.

FIG. 2 relates to a schematic diagram of a wireless terminal 20 according to an embodiment of the present disclosure. The wireless terminal 20 may be a user equipment (UE), a mobile phone, a laptop, a tablet computer, an electronic book or a portable computer system and is not limited herein. The wireless terminal 20 may include a processor 200 such as a microprocessor or Application Specific Integrated Circuit (ASIC), a storage unit 210 and a communication unit 220. The storage unit 210 may be any data storage device that stores a program code 212, which is accessed and executed by the processor 200. Embodiments of the storage unit 212 include but are not limited to a subscriber identity module (SIM), read-only memory (ROM), flash memory, random-access memory (RAM), hard-disk, and optical data storage device. The communication unit 220 may a transceiver and is used to transmit and receive signals (e.g. messages or packets) according to processing results of the processor 200. In an embodiment, the communication unit 220 transmits and receives the signals via at least one antenna 222 shown in FIG. 2.

In an embodiment, the storage unit 210 and the program code 212 may be omitted and the processor 200 may include a storage unit with stored program code.

The processor 200 may implement any one of the steps in exemplified embodiments on the wireless terminal 20, e.g., by executing the program code 212.

The communication unit 220 may be a transceiver. The communication unit 220 may as an alternative or in addition be combining a transmitting unit and a receiving unit configured to transmit and to receive, respectively, signals to and from a wireless network node (e.g. a base station).

Figure 3:
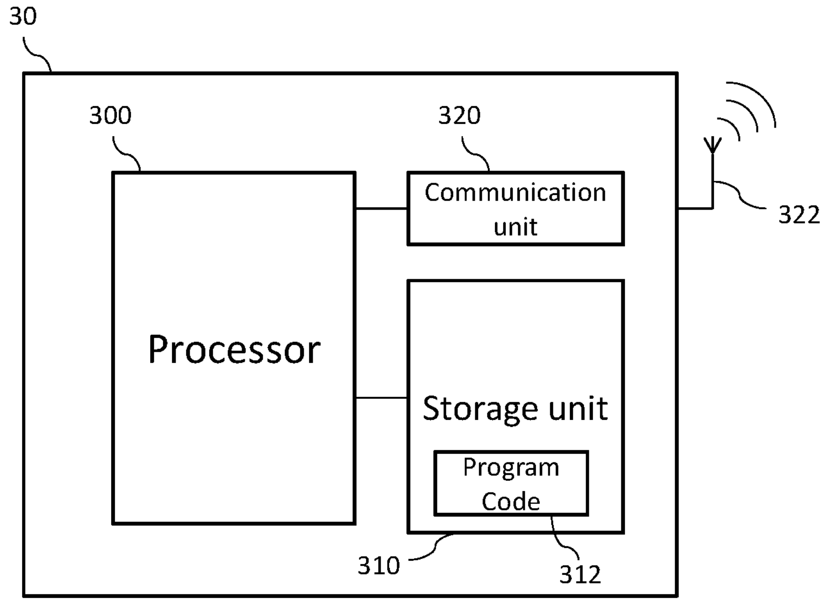
FIG. 3 shows an example of a schematic diagram of a wireless network node according to an embodiment of the present disclosure.

FIG. 3 relates to a schematic diagram of a wireless network node 30 according to an embodiment of the present disclosure. The wireless network node 30 may be a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the wireless network node 30 may comprise (perform) at least one network function such as an access and mobility management function (AMF), a session management function (SMF), a user place function (UPF), a policy control function (PCF), an application function (AF), etc. The wireless network node 30 may include a processor 300 such as a microprocessor or ASIC, a storage unit 310 and a communication unit 320. The storage unit 310 may be any data storage device that stores a program code 312, which is accessed and executed by the processor 300. Examples of the storage unit 312 include but are not limited to a SIM, ROM, flash memory, RAM, hard-disk, and optical data storage device. The communication unit 320 may be a transceiver and is used to transmit and receive signals (e.g. messages or packets) according to processing results of the processor 300. In an example, the communication unit 320 transmits and receives the signals via at least one antenna 322 shown in FIG. 3.

In an embodiment, the storage unit 310 and the program code 312 may be omitted. The processor 300 may include a storage unit with stored program code.

The processor 300 may implement any steps described in exemplified embodiments on the wireless network node 30, e.g., via executing the program code 312.

The communication unit 320 may be a transceiver. The communication unit 320 may as an alternative or in addition be combining a transmitting unit and a receiving unit configured to transmit and to receive, respectively, signals to and from a wireless terminal (e.g. a user equipment).

In present disclosure, embodiments are exemplified for reciting how to calculate value(s) for synchronization (e.g. synchronization value(s)) by UE itself based on assistance information received from the BS. Note that, skilled person in the art should acknowledge that the embodiments may be implemented individually or in potential combinations.

Embodiment 1: Calculation of Value(s) for Synchronization

In this embodiment, the value(s) for synchronization (e.g., for UL synchronization) is obtained (e.g. determined, calculated) based on the self-calculation at the UE side. After acquiring the value(s) for synchronization (e.g. timing advanced (TA) value(s) and/or frequency offset(s)), the UE applies the calculated value for corresponding UL transmission. In an embodiment, the UL transmission may comprise physical random access channel (PRACH), physical UL control channel (PUCCH), sounding reference signal (SRS), physical UL shared channel (PUSCH), etc. For example, the UL transmission may include Msg-A of a 2-step random access procedure, the PUSCH scheduled by DL control information (DCI), the PUSCH scheduled by a RACH response, and/or pre-configured PUSCH (e.g. periodic PUSCH). In addition, the UE may report the calculated value for synchronization to the BS.

In an embodiment, the UE may calculate (e.g. determine, obtain, acquire) the TA value(s) for synchronization based on timing information received from the BS. In an embodiment, the timing information may be related to transmissions from the BS to the UE. For example, the timing information may be an instant of either the beginning or ending of the sub-frame number (SFN), slot, half frame, or symbol carried in each transmission. In an embodiment, the timing information may be timing reference information (e.g., time stamp) or status information of the BS.

In an embodiment, the status information comprises location, mobility status, confidence level for each information, etc.

Figure 4:
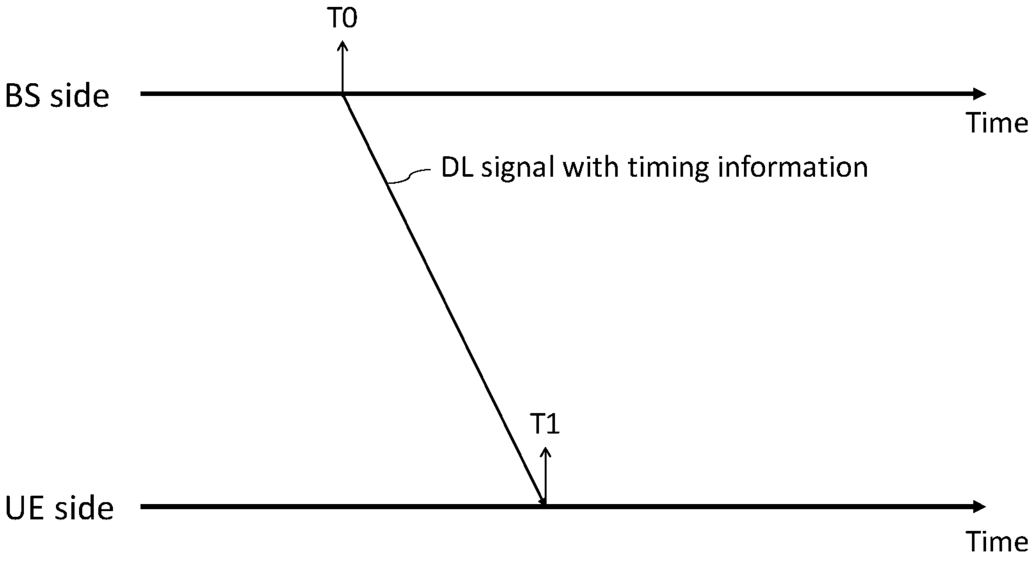
FIG. 4 shows a schematic diagram of DL transmission from the BS to the UE according to an embodiment of the present disclosure.

In an embodiment, the timing information may be included in contents of some channels (e.g. system information, physical DL shared channel (PDSCH) and physical DL control channel (PDCCH)). FIG. 4 shows a schematic diagram of DL transmission from the BS to the UE according to an embodiment of the present disclosure. In FIG. 4, the BS transmits a DL signal (e.g. DL channel) to the UE at time T0 and the UE receives the DL signal at time T1, wherein the DL signal comprises corresponding timing information of T0.

In an embodiment, the timing information may be sent periodically from the BS, e.g., in dedicated system information.

In an embodiment, the timing information is associated to each PDSCH. In this embodiment, the PDSCH may be UE-specified PDSCH scheduled with UE specific DL control information (DCI) and/or group-specified PDSCH scheduled with common PDCCH.

In an embodiment, the timing information is associated to the PDCCH (i.e. DCI). For example, the timing information may be directly included within the DCI. In another example, partial of the timing information is included in the DCI. In an embodiment, the partial of the timing information may comprise only values of fine-scale time units (e.g. second, millisecond and/or nano-second). That is, values of coarse-scale time units (e.g. day, month and/or year) may not be transmitted to the UE, so as to reduce signal overhead. In an embodiment, an indicator for indicating whether additional information (e.g. DCI) is used for scheduling the PDSCH with timing information is included.

In an embodiment, the timing information is divided into different components according to the granularity of indicated time units.

In an embodiment, the timing information may consist of fine-scale time units (e.g. second, millisecond and/or nano-second) and coarse-scale time units (e.g., day, month and/or year).

In an embodiment, the fine-scale time units and/or the coarse-scale time units may be determined according to requirements of wireless network (e.g. sub-carrier spacings used for transmitting and/or configuring resources).

In an embodiment, different components of the timing information refer to different parts of one bit string for time indication. For example, the components with the fine-scale time units may correspond to (e.g. indicated by) the LSB (least significant bit) part of one bit string. In another example, the components with the coarse scale time units may correspond to the MSB (most significant bit) part of one bit string.

In an embodiment, different components of the timing information are indicated by different bit strings for time indication.

In an embodiment, the different components of timing information are transmitted to UE with different periodicities. For example, the component with fine-scale time units may be transmitted in a periodicity P1 and the component with coarse-scale time units may be transmitted in a periodicity P2, where P1 is smaller than P2.

In an embodiment, the component corresponding to the coarse-scale granularity for time indication is indicated by system information.

In an embodiment, the component corresponding to the fine-scale granularity for time indication is indicated by PDCCH (i.e. DCI).

In an embodiment, the component corresponding to the fine-scale granularity for time indication is indicated by PDSCH.

In an embodiment, the timing information may be sent in response to a request from the UE.

In an embodiment, different timing components may be sent in response to corresponding requests from the UE.

In an embodiment, only the timing component with fine-scale granularity for time indication may be sent in response to a corresponding request from the UE.

In an embodiment, the timing information refers to absolutely timing for each transmission instant (e.g., starting or ending point of slot, sub-frame and frame).

After receiving the timing information, the UE is able to calculate the TA value itself.

In an embodiment, the TA value is determined by:

$$TA=(T1-T0)\times 2$$

In an embodiment, the TA value is determined by:

$$TA=(T1-T0)\times 2-\text{reference TA}$$

where the reference TA may be a required TA adjustment which is indicated by the BS.

In an embodiment, the calculated TA value may be quantized by a certain time unit.

In an embodiment, the UE may calculate (e.g. determine) TA value(s) and/or frequency offset(s) (e.g. Doppler drift) based on information received from the BS. For example, the information used for calculating the TA values and/or the frequency offsets may be status information, which is indicated from the BS.

In an embodiment, the frequency offset may be quantized by a sub-carrier spacing (SCS) or a channel raster. Note that, the SCS may refer to the SCS used for corresponding UL transmission or the minimum value among simultaneously transmitted UL signal cross different bandwidth parts (BWPs) or component carriers (CCs).

In an embodiment, the information used for calculating the TA value(s) and the frequency offset may comprise reference information and differential information, wherein the reference information comprises reference value(s) and the differential information comprises differential component(s) corresponding to the reference value(s). For example, the BS may firstly transmit the reference information comprising a reference value to the UE. Next, the BS may transmit the differential information comprising a differential component which indicates a differential change from the reference value.

In an embodiment, the UE calculates the TA values based on at least one of:

A) TA value obtained at and/or indicated from the BS

B) TA value drift rate obtained at and/or indicated from the BS

C) TA value calculated by the UE based on the information of a reference point.

In an embodiment, the TA value and/or TA value drift rate obtained at and/or indicated from the BS may be 0.

In an embodiment, the information of a reference point is indicated from BS to UE.

In an embodiment, the information of a reference point is pre-stored within the UE (SIM card and/or universal SIM (uSIM) card).

In an embodiment, the information of a reference point is status information of reference point.

In an embodiment, the information of a reference point is timing information of signals transmitted from the reference point.

In an embodiment, the reference point is the BS.

In an embodiment, the reference point is a projection of the BS, e.g., on a wireless terminal group.

In an embodiment, the reference point is virtual node, which is used by the BS for calculating the TA value and/or TA value drift rate.

In an embodiment, the TA value and/or TA value drift rate indicated from BS is common value for the UE.

Figure 5A:
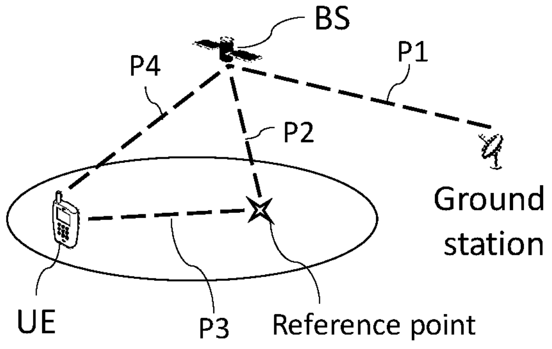
FIGS. 5A and 5B show examples of calculating values for synchronization according to embodiments of the present disclosure.
Figure 5B:
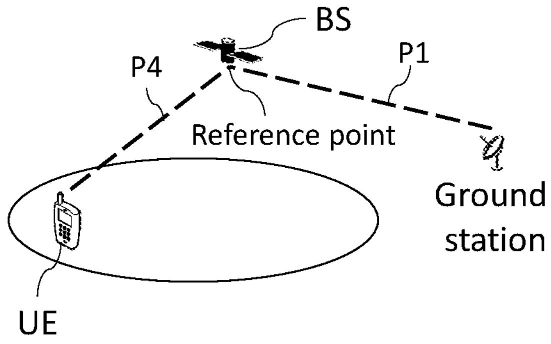

FIGS. 5A and 5B shows examples of calculating values for synchronization according to embodiments of the present disclosure. In FIG. 5A, the UE calculates TA value based on values (e.g. TA values and/or TA value drift rate) related to at least one of paths P1, P2 or P3, wherein the path P1 is the path between the BS and a ground station, the path P2 is the path between the BS and the reference point and the path P3 is the path between the UE and the reference point. Note that, the values related to the paths P1 and P2 are indicated from the BS and the values between the reference point and the UE (i.e. the path P3) is calculated by the UE based on the information related to the reference point. Note that, the information related to the reference point is indicated from the BS. In FIG. 5A, the reference point is a projection of the BS. In FIG. 5B, the UE calculates TA values based on values (e.g. TA and/or TA drift rate) related to path P1 which is indicated by the BS. In addition, the reference point is the BS.

In an embodiment, the UE calculates the Doppler drift based on at least one of:

A) Doppler drift obtained at and/or indicated from the BS
B) Doppler drift rate obtained at and/or indicated from the BS
C) Doppler drift calculated by the UE based on the information of a reference point.

In an embodiment, the Doppler drift and/or Doppler drift rate obtained at and/or indicated from the BS may be 0.

In an embodiment, the information of a reference point is indicated from BS to UE.

In an embodiment, the information of a reference point is pre-stored within the UE (e.g., SIM and/or uSIM card).

In an embodiment, the information of a reference point is status information of reference point.

In an embodiment, the information of a reference point is timing information of signal transmitted from the reference point.

In an embodiment, the reference point is the BS.

In an embodiment, the reference point is a projection of the BS, e.g., on a wireless terminal group.

In an embodiment, the reference point is virtual node, which is used by the BS for calculating the TA value and/or TA value drift rate.

For example, in FIG. 5A, the UE calculates the Doppler drift based on values (e.g. Doppler drift and/or Doppler drift rate) related to at least one of paths P1, P2 or P3. Note that, the TA values related to the paths P1 and P2 are indicated from the BS and the TA value between the reference point and the UE (i.e. the path P3) is calculated by the UE. In FIG. 5A, the reference point is a projection of the BS.

In FIG. 5B, the UE calculates the Doppler drift based on values (e.g. Doppler drift and/or Doppler drift rate) related to path P1 which is indicated by the BS. In addition, the reference point is the BS.

In Embodiment 1, the synchronization value (e.g. TA value and/or Doppler drift) is calculated by the UE according to the information received/indicated from the BS.

In an embodiment, the information used by the UE for calculating the TA value may be:

1) Timing information related to (DL) transmissions only;
2) Status information of the reference point (e.g., the BS) only;
3) Timing information related to (DL) transmissions and status information of the reference point (e.g., the BS);
4) Timing information related to (DL) transmissions and TA value indicated by BS;
5) Timing information related to (DL) transmissions, TA value and TA value drift rate indicated from wireless network node;
6) Status information of the reference point (e.g. the BS), TA value and TA value drift rate indicated from wireless network node; and/or
7) TA value and TA value drift rate indicated from the BS.

In an embodiment, the indicated TA value and/or TA value drift rate from the BS is obtained by the BS.

In an embodiment, the information used by the UE for calculating the Doppler drift (i.e. frequency offset) may be:

1) Status information of the reference point (e.g. the BS) only;
2) Status information of the reference point (e.g. the BS) and Doppler drift indicated from the BS;
3) Timing information related to transmissions, Doppler drift indicated from the BS and Doppler drift rate indicated from the BS; and/or
4) Doppler drift indicated from the BS and Doppler drift rate indicated from the BS.

In an embodiment, the indicated Doppler drift and/or Doppler drift rate from the BS is obtained by the BS.

Embodiment 2

In this embodiment, the UE applies the calculated synchronization value for UL transmissions.

In an embodiment, the UE applies the calculated synchronization value a time offset after calculating the synchronization value, wherein the time offset is greater than or equal to a gap threshold T_gap. In an embodiment, the gap threshold T_gap is determined based on UE capability and/or configured by the BS (i.e. determined based on configuration from the BS).

Figure 6:
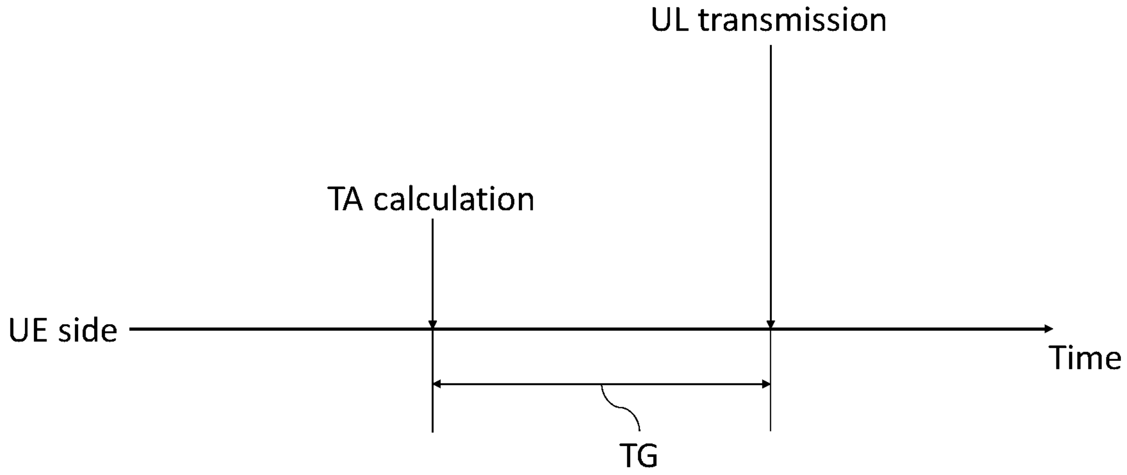
FIG. 6 shows a timing diagram according to an embodiment of the present disclosure.

FIG. 6 shows a timing diagram according to an embodiment of the present disclosure. In FIG. 6, the UE calculates the TA for synchronization and applies the calculated TA to a subsequent UL transmission. Note that, a time gap TG is inserted between the TA calculation and the UL transmission and is greater than or equal to the gap threshold T_gap.

In an embodiment, the UL transmission (e.g. PUSCH-X) has a long duration in time domain. For example, the UL transmission may have a duration exceeding a duration threshold T_dur. Under such a condition, the UL transmission is divided into several transmission parts and a time gap (e.g., TG shown in FIG. 6) is inserted between every two contiguous transmission parts.

Figure 7:
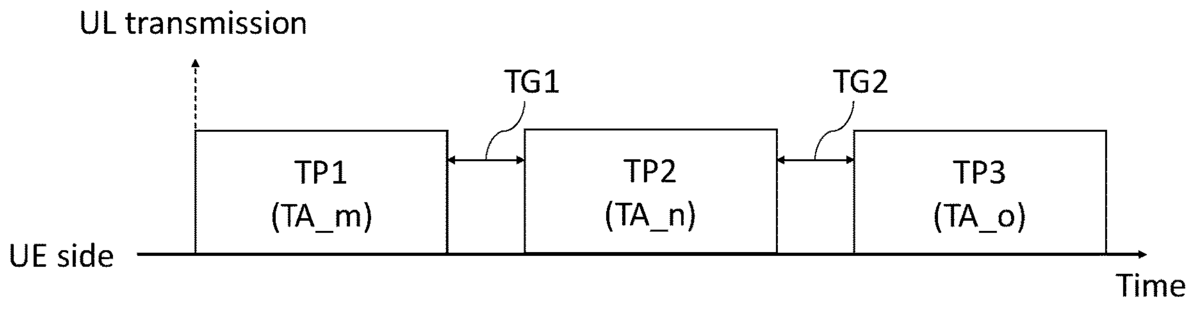
FIG. 7 shows a timing diagram according to an embodiment of the present disclosure.

FIG. 7 shows a timing diagram according to an embodiment of the present disclosure. In FIG. 7, the UL transmission has a duration exceeding the duration threshold T_dur and is divided into 3 transmission parts TP1, TP2 and TP3. For example, the durations of TP1, TP2 and TP3 are smaller than the duration threshold T_dur.

In addition, the UE applies different TA values TA_m, TA_n and TA_o respectively for the TP1, TP2 and TP3 as shown in FIG. 7.

In an embodiment, the TA value applied for each transmission part is obtained before each transmission part is transmitted (e.g., obtained within the time gap before each transmission part). Thus, the time gap between every two contiguous transmission parts (e.g. TG1 and TG2 shown in FIG. 7) is greater than or equal to the gap threshold T_gap.

In an embodiment, the gap threshold T_gap and/or the duration threshold T_dur is either configured by the BS or pre-defined with fixed value.

In an embodiment, the determinations of different TA values TA_m, TA_n and TA_o may be different. That is, the TA values TA_m, TA_n and TA_o may be determined by different manners.

In an embodiment, the determination of the first TA value is different from determinations of other TA values.

In an embodiment, the unit of the gap threshold T_gap and/or the duration threshold T_dur may be a slot, a symbol, a frame or ms.

Figure 8:
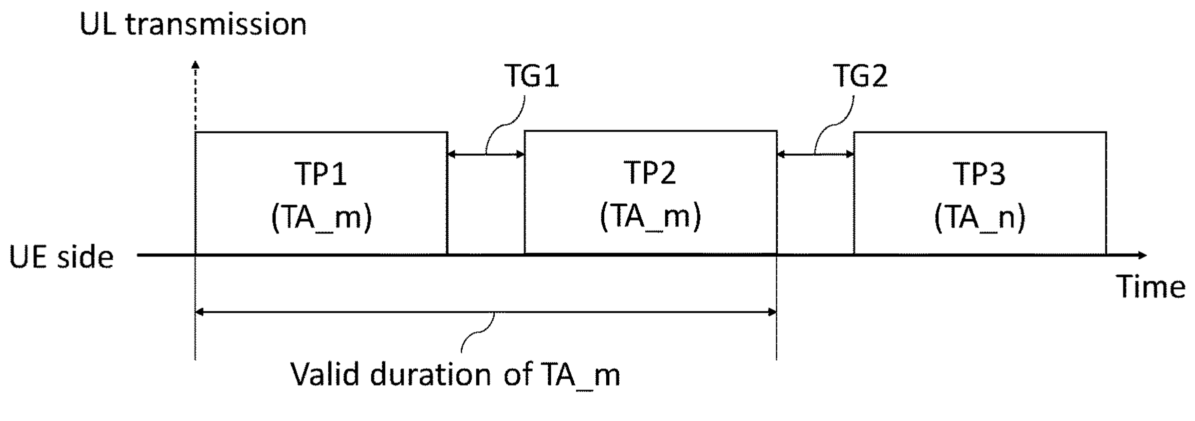
FIG. 8 shows a timing diagram according to an embodiment of the present disclosure.

FIG. 8 shows a timing diagram according to an embodiment of the present disclosure. In FIG. 8, the UL transmission has a duration exceeding the duration threshold T_dur and is divided into 3 transmission parts TP1, TP2 and TP3, wherein the durations of TP1, TP2 and TP3 are smaller than the duration threshold T_dur. In addition, a TA value TA_m is applied for the TP1 and TP2, and a TA value TA_n is applied for the TP3.

More specifically, in FIG. 8, additional valid time threshold T_valid is applied, wherein the valid time threshold T_valid refers to the maximum valid duration of single TA value is applied. That is, each TA value is applied for transmission parts within its valid duration, which is smaller than the valid time threshold T_valid. For example, the TP1 and TP2 in the valid duration of TA_m and thus share the same TA value (i.e. TA_m). Note that, the valid duration of TA_m is smaller than the valid time threshold T_valid.

In an embodiment, the valid duration of each TA value may start from the first transmission part (e.g., first symbol of transmission part) for which the TA is applied. In this embodiment, the valid time threshold T_valid may be multiple times of T_dur or T_gap.

In an embodiment, the determinations of different TA values TA_m, and TA_n may be different from each other.

In an embodiment, the determination of the first TA value is different from those of other TA values.

In an embodiment, the valid duration of TA values may be a periodical pattern with duration of T_valid, wherein the start point of this pattern may be a time point To, which can be determined as subframe number (SFN) X (e.g. X=0).

Figure 9:
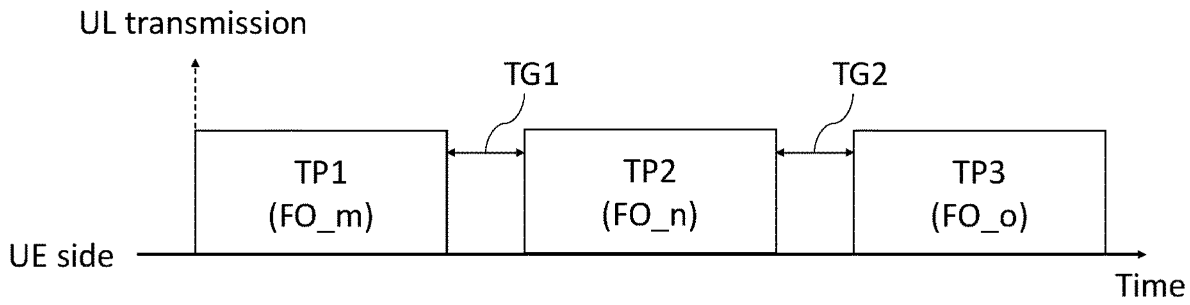
FIG. 9 shows a timing diagram according to an embodiment of the present disclosure.

FIG. 9 shows a timing diagram according to an embodiment of the present disclosure. In FIG. 9, the UL transmission has a duration exceeding the duration threshold T_dur and is divided into 3 transmission parts TP1, TP2 and TP3. For example, the durations of TP1, TP2 and TP3 are smaller than the duration threshold T_dur.

In addition, the UE applies different frequency offsets FO_m, FO_n and FO_o respectively for the TP1, TP2 and TP3 as shown in FIG. 9.

In an embodiment, the frequency offset applied for each transmission part is obtained before each transmission part is transmitted (e.g., obtained within the time gap before each transmission part). Thus, the time gap between every two contiguous transmission parts (e.g. TG1 and TG2 shown in FIG. 9) is greater than or equal to the gap threshold T_gap.

In an embodiment, the gap threshold T_gap and/or the duration threshold T_dur is either configured by the BS or pre-defined with fixed value.

Figure 10:
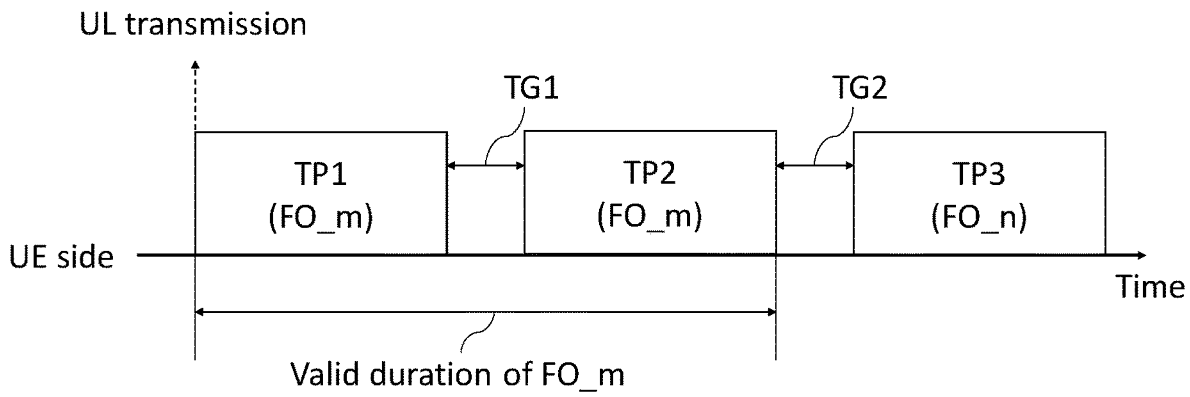
FIG. 10 shows a timing diagram according to an embodiment of the present disclosure.

FIG. 10 shows a timing diagram according to an embodiment of the present disclosure. In FIG. 10, the UL transmission has a duration exceeding the duration threshold T_dur and is divided into 3 transmission parts TP1, TP2 and TP3, wherein the durations of TP1, TP2 and TP3 are smaller than the duration threshold T_dur. In addition, a frequency offset FO_m is applied for the TP1 and TP2, and a frequency offset FO_n is applied for the TP3.

More specifically, in FIG. 10, the valid time threshold T_valid is applied, wherein the valid time threshold T_valid refers to the maximum valid duration of single frequency offset being applied. That is, each frequency offset is applied for transmission parts within its valid duration, which is smaller than the valid time threshold T_valid. For example, the TP1 and TP2 are in the valid duration of FO_m and thus share FO_m. Note that, the valid duration of FO_m is smaller than the valid time threshold T_valid.

In an embodiment, the valid duration of each frequency offset may start from the first transmission part (e.g., first symbol of transmission part) for which the TA is applied. In this embodiment, the valid time threshold T_valid may be multiple times of T_dur or T_gap.

In an embodiment, the valid duration of frequency offsets may be a periodical pattern with duration of T_valid, wherein the start point of this pattern may be a time point To, which can be determined as subframe number (SFN) X (e.g. X=0).

In an embodiment, the synchronization value(s) applied for a UL transmission may comprises at least one of:

- synchronization value(s) which is determined as a time offset (e.g. greater than the gap threshold T_gap) before the UL transmission,
- synchronization value(s) which is determined as the time offset before receiving scheduling information of the UL transmission, or
- synchronization value(s) which is reported before receiving the scheduling information of the UL transmission.

Embodiment 3

In this embodiment, the UE reports the calculated value for synchronization (e.g. TA value and/or frequency offset) to the BS.

In an embodiment, the UE may report the calculated value for synchronization in response to a request received from the BS. That is, the report of the calculated value for synchronization is triggered by the BS.

In an embodiment, the UE may report the calculated value for synchronization in a random access procedure (e.g. PRACH procedure). For example, the calculated value for synchronization may be reported during the initial access to the BS, in PRACH in response to the triggering due to UL synchronization error, or in PRACH during a beam failure (e.g. a link recovery procedure), etc.

In an embodiment, the UE may report the calculated value for synchronization in response to a configuration received from the BS.

In an embodiment, the UE reports the calculated value for synchronization within pre-configured resources (e.g. periodic resources). In an embodiment, the UE reports the calculated value for synchronization within pre-configured resources when at least one pre-defined criterion is fulfilled.

Figure 11:
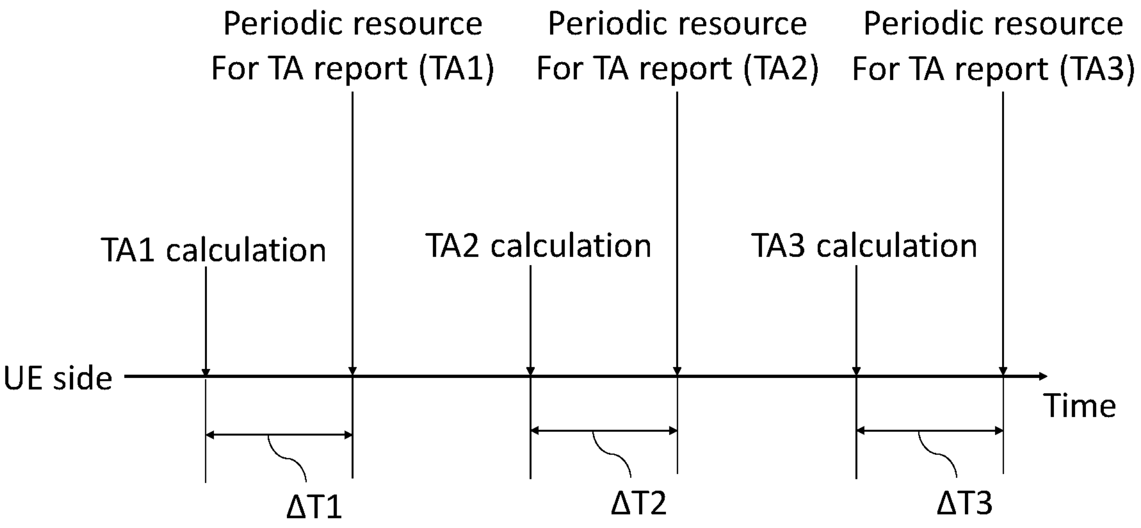
FIG. 11 shows a timing diagram according to an embodiment of the present disclosure.

In an embodiment, the pre-defined criterion may be that the latest calculated value reported in a periodic resource is calculated a time offset ΔT before the periodic resource. FIG. 11 shows a timing diagram according to an embodiment of the present disclosure. In FIG. 11, the UE calculates a TA value TA1 and reports the calculated TA1 on the next periodic resource because a time offset ΔT1 between the calculation of TA1 and the next periodic resource for reporting TA is greater than the time offset ΔT. Similarly, the UE calculates TA values TA2 and TA3 and reports the TA2 and TA3 respectively on corresponding because both of the time offsets ΔT2 and ΔT3 are greater than the time offset ΔT.

In an embodiment, the UE may ignore/cancel/drop the occasion for reporting the calculated value for synchronization when the at least one predefined criterion is not fulfilled.

Figure 12:
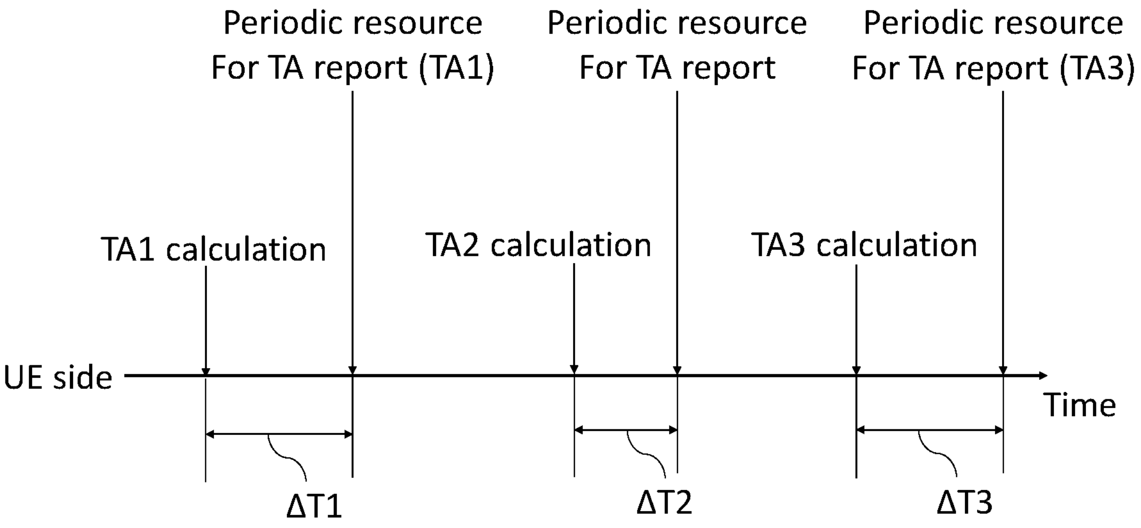
FIG. 12 shows a timing diagram according to an embodiment of the present disclosure.

FIG. 12 shows a timing diagram according to an embodiment of the present disclosure. In FIG. 12, the UE calculates a TA value TA1 and reports the calculated TA1 on the next periodic resource because a time offset ΔT1 between the calculation of TA1 and the next periodic resource for reporting TA is greater than the time offset ΔT. Next, the UE calculates a TA value TA2. However, a time offset ΔT2 between the calculation of TA2 and a subsequent periodic resource for TA report is smaller than the time offset ΔT. Thus, the TA2 is not reported in the next periodic resource.

In an embodiment, the UE may ignore/cancel/drop the occasion for reporting the calculated value for synchronization when the resource for TA report collides with other channels (e.g. PUCCH carrying ACK or PUSCH carrying CSI).

Figure 13:
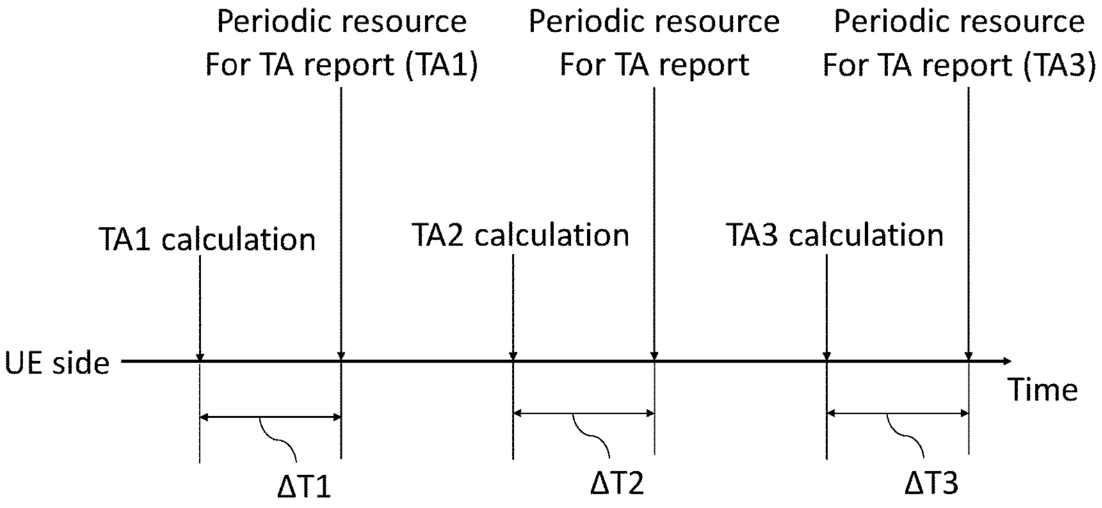
FIG. 13 shows a timing diagram according to an embodiment of the present disclosure.

FIG. 13 shows a timing diagram according to an embodiment of the present disclosure. In FIG. 13, the UE calculates a TA value TA1 and reports the calculated TA1 on the next periodic resource because a time offset ΔT1 between the calculation of TA1 and the next periodic resource for reporting TA is greater than the time offset ΔT. Next, the UE calculates a TA value TA2. Although a time offset ΔT2 between the calculation of TA2 and subsequent periodic resource for TA report is greater than the time offset ΔT, the UE does not report the TA2 in the next periodic resource because the periodic resource collides with the PUSCH carrying CSI.

In an embodiment, the value for synchronization reported to the BS is the value applied for the UL transmission.

In an embodiment, the value for synchronization reported to the BS is the latest determined value.

In an embodiment, the value for synchronization reported to the BS is the value determined a time offset before reporting (e.g. the resources for reporting).

In an embodiment, the value for synchronization reported to the BS is the value determined a time offset before receiving scheduling information for reporting.

In an embodiment, the calculated value for synchronization is carried in a message for a random access procedure. Note that, the calculated value for synchronization is carried in data part of the message for the random access procedure. For example, the calculated value for synchronization may be carried within PUSCH for Msg-A of a two-step random access procedure.

In an embodiment, multiple different TAs may be applied between the preamble and the associated PUSCH within a single Msg-A. In this embodiment, the calculated values for synchronization reported to the BS are those applied for the associated PUSCH.

In an embodiment, the PUSCH of a single Msg-A is across multiple time durations with different TAs (i.e. multiple different TAs are used in the PUSCH across multiple time durations). In this embodiment, the first TA and/or the last TA applied for the PUSCH is reported to the BS.

Figure 14:
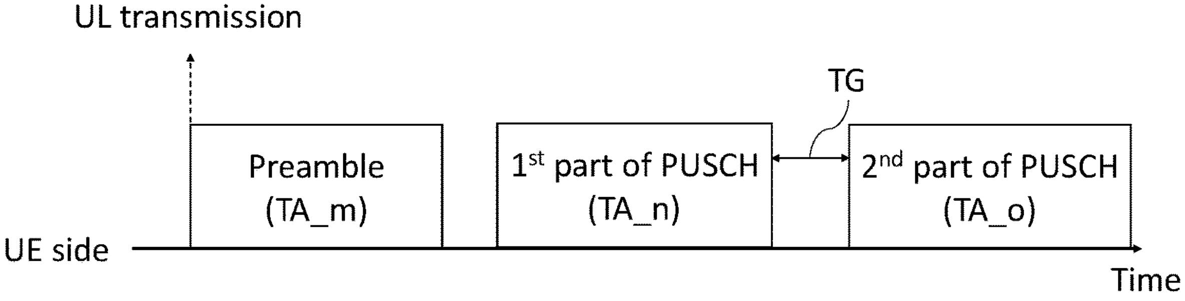
FIG. 14 shows a schematic diagram of a message for random access procedure according to an embodiment.

FIG. 14 shows a schematic diagram of a message for random access procedure according to an embodiment. In FIG. 14, the message is the Msg-A of the two-step random access procedure and comprises a preamble and PUSCH (data part) which is divided into two parts. In addition, the preamble is transmitted by applying a TA value TA_m, $1^{st}$ part of the PUSCH is transmitted by applying a TA value TA_n and $2^{nd}$ part of the PUSCH is transmitted by applying for a TA value TA_o. In an embodiment, the UE reports TA value(s) applied for the PUSCH (i.e. TA_n and TA_o) in the PUSCH. In an embodiment, the UE reports the first TA value applied for the PUSCH (i.e. TA_n). In an embodiment, the UE reports the last TA value applied for the PUSCH (i.e. TA_o).

In an embodiment, the calculated value for synchronization is reported in PUSCH scheduled from the BS. In this embodiment, the UE may report the latest calculated value or the value lastly applied for this PUSCH to the BS.

Figure 15:
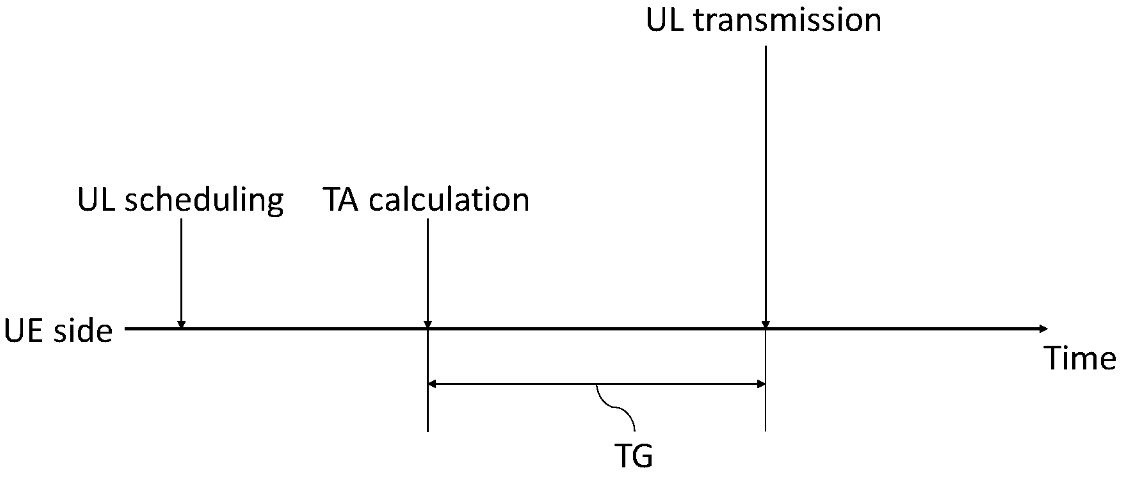
FIG. 15 shows a timing diagram according to an embodiment of the present disclosure.

FIG. 15 shows a timing diagram according to an embodiment of the present disclosure. In FIG. 15, the UE receives UL scheduling from the BS for a UL transmission. In an embodiment, the UL transmission may be a PUSCH (e.g. Msg3 of 4-step random access procedure). The UE calculates a TA value and the calculation of the TA value is a time gap TG before the UL transmission. The TA value is valid for the UL transmission because the time gap TG is greater than the gap threshold T_gap. Thus, the UE applies the TA value for the UL transmission and reports the TA value to the BS.

Figure 16:
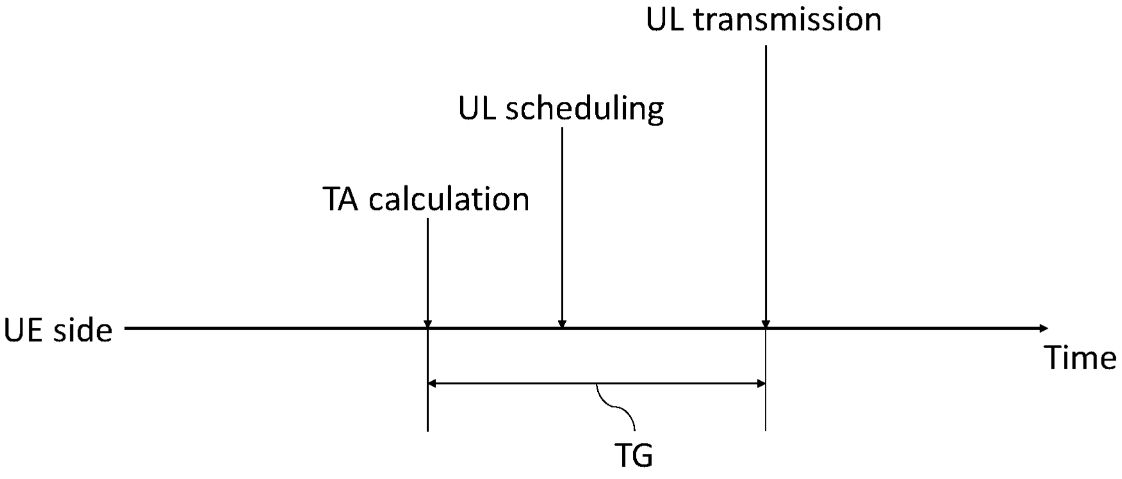
FIG. 16 shows a timing diagram according to an embodiment of the present disclosure.

FIG. 16 shows a timing diagram according to an embodiment of the present disclosure. In FIG. 16, the UE calculates a TA value before receiving UL scheduling for a UL transmission (e.g. Msg-3). Because the time gap TG between the calculation and the UL transmission is greater than the gap threshold T_gap, the UE applies the calculated TA value for the UL transmission and reports the calculated TA value.

In an embodiment, after receiving the value for synchronization from the UE, the BS applies the received value (e.g. TA value and/or frequency offset) for scheduling UL resources (e.g. DCI based PUSCH scheduling) of the UE.

In an embodiment, the scheduling offset for the UL transmission should be determined based on the latest reported TA value which satisfies the time restriction for reporting application (e.g. after a time offset greater than the threshold T_gap).

Moreover, the subsequent UL transmission at the UE side may follow the scheduling offset which is indicated by the BS and adjusted based on the calculated value in the latest valid report.

Figure 17:
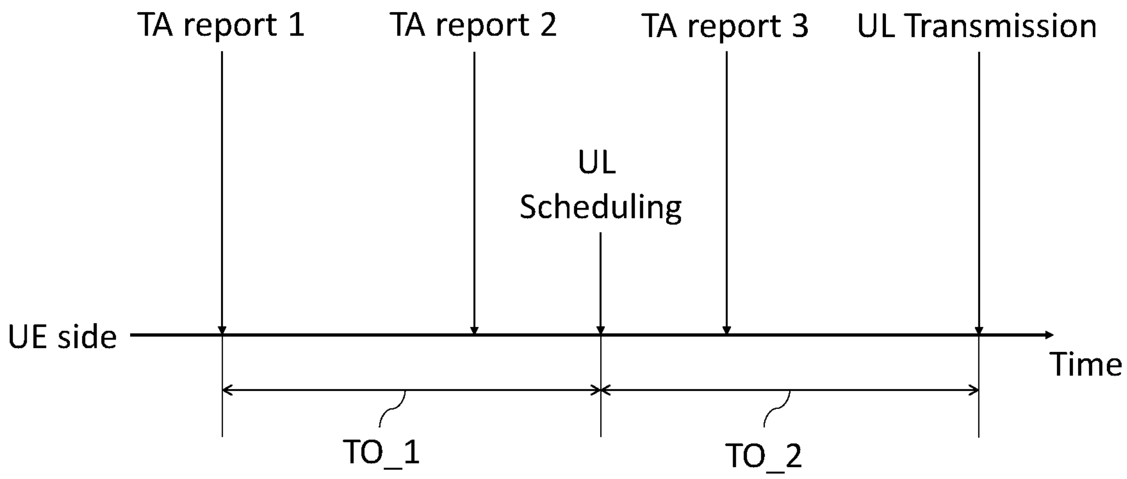
FIG. 17 shows a timing diagram according to an embodiment of the present disclosure.

FIG. 17 shows a timing diagram according to an embodiment of the present disclosure. In FIG. 17, the UE contiguously transmits TA reports TAR1, TAR2 and TAR3 with TA values calculated at the UE side. The UE receives UL scheduling from the BS and a time offset TO_1 between the TAR1 and the UL scheduling satisfies the timing restriction. Under such a condition, the UL scheduling may be determined based on the TA value(s) reported in the TA report TA1.

Moreover, the UE performs a UL transmission (e.g. PUSCH) a time offset TO_2 after receiving the UL scheduling, wherein the time offset TO_2 satisfies the time restriction. That is, the scheduled offset of this UL transmission may follow the TA value indicated by the BS (i.e. UL scheduling) and be adjusted based on TA value calculated itself.

In an embodiment, the TA value applied for the UL transmission (e.g. PUSCH) is determined based on the latest calculated or reported TA value when the value is equal to or less than the value within the latest valid report.

In an embodiment, the reported TA value may refer to the directly calculated TA value, which is quantized with the pre-defined granularity with consideration on the SCS, e.g., slot, symbol, Ts or X*Ts.

In an embodiment, the reported TA value can also refer to a difference with regarding to the latest calculated value and/or the previous reported value.

In an embodiment, the self-calculation of TA value or frequency offset for synchronization may be enabled or disabled by the BS. For example, the BS may enable/disable the self-calculation of TA value or frequency offset for synchronization via an explicit signaling or a configuration on the resource for TA report. In an embodiment, when all of the TA value and/or frequency offset is indicated by the BS, report from the UE side is not needed.

In an embodiment, the self-calculation of TA value and/or frequency offset for synchronization may be enabled/disable based on the UE capability.

In an embodiment, for initial accessing, different resource configurations (e.g., PRACH format and PO) are used for different capabilities.

Figure 18:
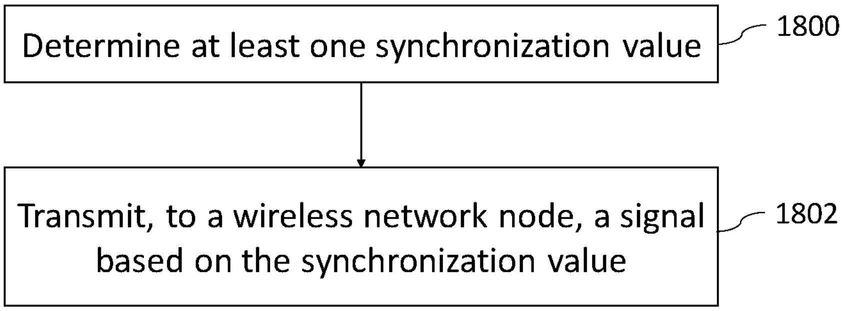
FIG. 18 shows a flow chart of a process according to an embodiment of the present disclosure.

FIG. 18 shows a flow chart of a process according to an embodiment of the present disclosure. The process shown in FIG. 18 may be utilized in a wireless terminal (e.g. UE) and comprises the following steps:

Step 1800: Determine at least one synchronization value;

Step 1802: Transmit, to a wireless network node, a signal based on the synchronization value.

More specifically, the wireless terminal determines (e.g. calculates) synchronization value(s) (e.g. TA value and/or frequency offset) itself, wherein references utilized by the UE for determining the synchronization value(s) may be information received from the wireless network node (e.g. BS). The information received from the wireless network node may comprises at least one component of at least one of:

- timing information related to transmissions from the wireless network node to the wireless terminal,
- status information of the wireless network node,
- timing advanced value obtained at the wireless network node,
- timing advanced value drift rate obtained at the wireless network node,
- Doppler drift obtained at the wireless network node, or
- Doppler drift rate obtained at the wireless network node.

In an embodiment, the wireless terminal may transmit a request for the information used for determining the synchronization value(s) to the wireless network node.

In an embodiment, the information comprises at least one differential component corresponding to the at least one status value.

Next, the wireless terminal transmits signal based on the determined synchronization value(s). In an embodiment, the signal may comprise at least one of a random access message (e.g. Msg-A or Msg-3), PUSCH scheduled by the wireless network node, PUSCH scheduled by the wireless network node, or periodic UL resource configured by the wireless network node.

Note that, the wireless terminal may apply the determined synchronization value(s) for transmitting the signal (e.g. UL transmission) and/or the wireless terminal may transmit the signal in which the determined synchronization value(s) is carried. For example, the wireless terminal may adjust timing/frequency offset of UL transmissions based on the determined synchronization value(s). In another example, the wireless terminal may report the determined synchronization value(s) in the corresponding UL transmissions.

In an embodiment, the synchronization value applied for the UL transmission is applied (a time offset) after being determined. The time offset may be greater than a threshold.

In an embodiment, the synchronization value applied for transmitting the signal comprises at least one of:

- a synchronization value determined a time offset before transmitting the signal,
- a synchronization value determined the time offset before receiving scheduling information for transmitting the signal, or
- a synchronization value reported to the wireless network before receiving the scheduling information for transmitting the signal.

In an embodiment, the transmission of signal is divided into multiple transmission parts, e.g. a duration of the transmission is longer than a duration threshold. In this embodiment, the each of the plurality of transmission parts is transmitted by applying one of the determined synchronization value(s).

In an embodiment, a gap is inserted in every two contiguous transmission parts. Note that, the gap may have the same restriction of applying the synchronization value (i.e. larger than the threshold).

In an embodiment, a time length of each of the plurality of transmission parts is smaller than the duration threshold.

In an embodiment, the synchronization value(s) is transmitted in the signal a time offset after the synchronization value(s) is determined.

In an embodiment, the transmission of the synchronization value(s) does not collide with other channel transmissions.

In an embodiment, the synchronization value(s) is transmitted in data part of a message for random access procedure (e.g. Msg-A or Msg-3).

In an embodiment, the synchronization value(s) applied for the signal is carried in the signal.

In an embodiment, the signal carrying the at least one synchronization value is transmitted in at least one of following cases:

- receiving a request for the at least one synchronization value from the wireless network node,
- receiving a configuration for reporting the at least one synchronization value from the wireless network node, or
- performing a random access procedure.

In an embodiment, the latest synchronization value(s) applied for the signal is carried in the signal.

In an embodiment, the synchronization value determined a time offset before transmitting the signal is carried in the signal.

In an embodiment, the synchronization value determined a time offset before receiving scheduling information for transmitting the signal is carried in the signal.

Figure 19:
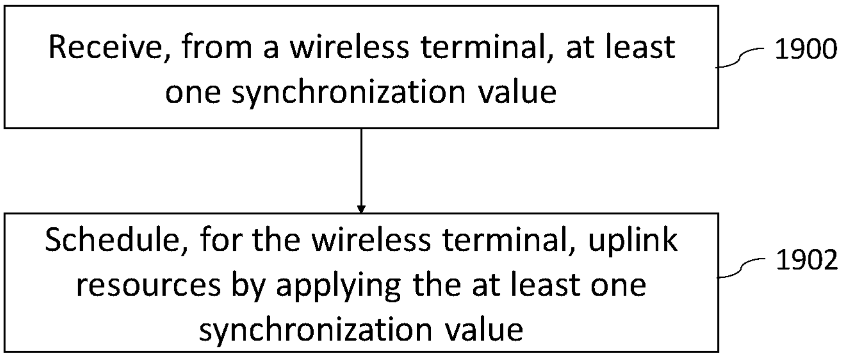
FIG. 19 shows a flow chart of a process according to an embodiment of the present disclosure.

FIG. 19 shows a flowchart of a process according to an embodiment of the present disclosure. The process may be utilized in a wireless network node and comprises the following steps:

Step 1900: Receive, from a wireless terminal, at least one synchronization value;

Step 1902: Schedule, for the wireless terminal, uplink resources by applying the at least one synchronization value.

More specifically, the wireless network node (e.g. BS) may receive synchronization value(s) calculated by the wireless terminal (e.g. UE) and applies the received synchronization value(s) for scheduling UL resources of the wireless terminal.

In an embodiment, the synchronization value(s) may comprises TA value(s) and/or frequency offset(s).

In an embodiment, the frequency offset(s) is quantized by one of a sub-carrier spacing or a channel raster.

In an embodiment, the synchronization value(s) is carried in at least one of a random access message (e.g. Msg-A or Msg-3), PUSCH scheduled by the wireless network node, PUSCH scheduled by the wireless network node, or periodic uplink resource configured by the wireless network node.

In an embodiment, the synchronization value applied for scheduling the uplink resources is used a time offset after the synchronization value is received.

In an embodiment, the uplink resources are scheduled based on the latest synchronization value received from the wireless terminal.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method for use in a wireless terminal, the wireless communication method comprising:

determining a plurality of synchronization values based on information received from a wireless network node, wherein the information received from the wireless network node includes at least one of a timing advanced value obtained at the wireless network node, or a timing advanced value drift rate obtained at the wireless network node; and transmitting, to the wireless network node, an uplink signal based on the plurality of synchronization values by applying the plurality of synchronization values after the plurality of synchronization values is determined, wherein the transmission of the uplink signal comprises a segmentation of a single uplink signal transmission into a plurality of transmission parts, wherein each of the plurality of transmission parts is transmitted by respectively applying one of the plurality of synchronization values, wherein at least two transmission parts of the plurality of transmission parts are transmitted by applying different synchronization values, wherein a time gap is inserted between two contiguous transmission parts of the plurality of transmission parts to provide time for the wireless terminal to determine and apply a subsequent one of the plurality of synchronization values for a subsequent transmission part, wherein a time length of each of the plurality of transmission parts is smaller than a duration threshold, wherein a valid time of applying each of the plurality of synchronization values is smaller than a valid time threshold.

2. The wireless communication method of claim 1, wherein the plurality of synchronization values comprises a timing advanced value.

3. A wireless communication method for use in a wireless network node, the wireless communication method comprising:

transmitting, to a wireless terminal, information for determining a plurality of synchronization values, wherein the information includes at least one of a timing advanced value obtained at the wireless network node, or a timing advanced value drift rate obtained at the wireless network node; and receiving, from the wireless terminal, an uplink signal based on the plurality of synchronization values, wherein receiving of the signal comprises receiving a segmentation of a single uplink signal transmission into a plurality of transmission parts, wherein at least two transmission parts of the plurality of transmission parts are received having been transmitted by applying different synchronization values, wherein a time gap is between two contiguous transmission parts of the plurality of transmission parts to provide time for the wireless terminal to determine and apply a subsequent one of the plurality of synchronization values for a subsequent transmission part, wherein a time length of each of the plurality of transmission parts is smaller than a duration threshold, wherein a valid time of applying each of the plurality of synchronization values is smaller than a valid time threshold.

4. The wireless communication method of claim 3, wherein the plurality of synchronization values comprises a timing advanced value.

5. A wireless terminal, comprising:

at least one processor configured to:

determine a plurality of synchronization values based on information received from a wireless network node, wherein the information received from the wireless network node includes at least one of a timing advanced value obtained at the wireless network node, or a timing advanced value drift rate obtained at the wireless network node; and transmit, via a transmitter to the wireless network node, an uplink signal based on the plurality of synchronization values by applying the plurality of synchronization values after the plurality of synchronization values is determined, wherein the transmission of the uplink signal comprises a segmentation of a single uplink signal transmission into a plurality of transmission parts, wherein each of the plurality of transmission parts is transmitted by respectively applying one of the plurality of synchronization values, wherein at least two transmission parts of the plurality of transmission parts are transmitted by applying different synchronization values, wherein a time gap is inserted between two contiguous transmission parts of the plurality of transmission parts to provide time for the wireless terminal to determine and apply a subsequent one of the plurality of synchronization values for a subsequent transmission part, wherein a time length of each of the plurality of transmission parts is smaller than a duration threshold, wherein a valid time of applying each of the plurality of synchronization values is smaller than a valid time threshold.

6. The wireless terminal of claim 5, wherein the plurality of synchronization values comprises a timing advanced value.

7. A wireless network node, comprising:

at least one processor configured to:

transmit, to a wireless terminal, information for determining a plurality of synchronization values, wherein the information includes at least one of a timing advanced value obtained at the wireless network node, or a timing advanced value drift rate obtained at the wireless network node; and receive, from the wireless terminal, an uplink signal based on the plurality of synchronization values, wherein the at least one processor is configured to receive the signal by receiving a segmentation of a single uplink signal transmission into a plurality of transmission parts, wherein a time gap is between two contiguous transmission parts of the plurality of transmission parts to provide time for the wireless terminal to determine and apply a subsequent one of the plurality of synchronization values for a subsequent transmission part, wherein a time length of each of the plurality of transmission parts is smaller than a duration threshold, wherein a valid time of applying each of the plurality of synchronization values is smaller than a valid time threshold.

8. The wireless network node of claim 7, wherein the plurality of synchronization values comprises a timing advanced value.

* * * * *